United States Patent
Pohl

(10) Patent No.: US 12,013,184 B2
(45) Date of Patent: Jun. 18, 2024

(54) DEVICE FOR PRODUCING EXPANDED MINERAL GRANULATED MATERIAL

(71) Applicant: Johannes Pohl, Graz (AT)

(72) Inventor: Johannes Pohl, Graz (AT)

(*) Notice: Subject to any disclaimer, the term of this patent is extended or adjusted under 35 U.S.C. 154(b) by 659 days.

(21) Appl. No.: 17/052,288

(22) PCT Filed: Apr. 29, 2019

(86) PCT No.: PCT/AT2019/050016
§ 371 (c)(1),
(2) Date: Mar. 11, 2021

(87) PCT Pub. No.: WO2019/210338
PCT Pub. Date: Nov. 7, 2019

(65) Prior Publication Data
US 2021/0396471 A1 Dec. 23, 2021

(30) Foreign Application Priority Data
May 2, 2018 (AT) .............................. A 50367/2018

(51) Int. Cl.
*C04B 20/06* (2006.01)
*C04B 14/14* (2006.01)
(Continued)

(52) U.S. Cl.
CPC ................ *F27B 9/24* (2013.01); *C04B 14/14* (2013.01); *C04B 20/06* (2013.01); *C04B 20/066* (2013.01);
(Continued)

(58) Field of Classification Search
CPC ...... F27B 1/00; F27B 1/02; F27B 9/24; F27D 3/18; C04B 14/14; C04B 20/06; C04B 20/066
See application file for complete search history.

(56) References Cited

U.S. PATENT DOCUMENTS 2,431,884 A 12/1947 Neuschotz
4,347,155 A * 8/1982 Jenkins ................. C04B 20/066
432/15

(Continued)

FOREIGN PATENT DOCUMENTS

AT 525539 B1 * 5/2023
EP 2708517 A1 3/2014
(Continued)

OTHER PUBLICATIONS

Espacenet English Abstract for FR2268227, Nov. 14, 1975.

*Primary Examiner* — Gregory A Wilson
(74) *Attorney, Agent, or Firm* — Tiajoloff & Kelly LLP

(57) ABSTRACT

An apparatus for producing a bloated mineral granulate with a heated processing channel (1) for the mineral granulate fed to a conveying flow (13), wherein an inflow opening (4) is provided in the processing channel (1) for forming a granulate-free laminar flow (5) running along the inner wall of the processing channel, is described. In order to design a device of the type described above in such a way that a continuous, qualitatively controllable production process is achieved, it is proposed in that the processing channel (1) comprises two channel sections (16), (17) with differing cross-sections, wherein the channel section (16) with a smaller cross-section projects into the channel section (17) with a larger cross-section, forming the inflow opening (4), and wherein the channel section (16) with a smaller cross-section is enclosed by the channel section (17) with a larger cross-section in such a way that an inflow opening (4) is formed completely around the projecting region of the channel section (16) with a smaller cross-section.

16 Claims, 2 Drawing Sheets

Figure 1:
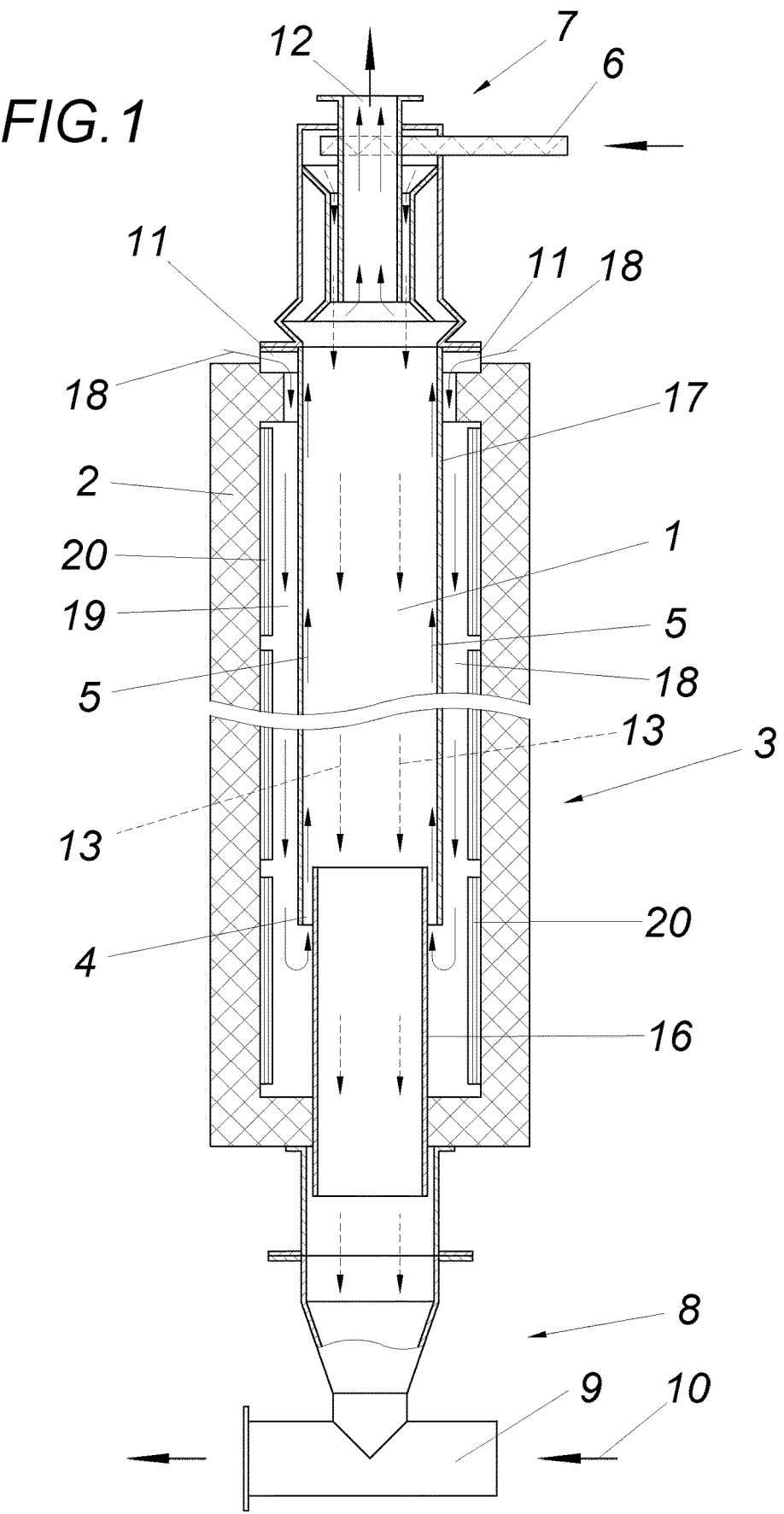

(51) Int. Cl.
  *F27B 9/24* (2006.01)
  *F27D 3/18* (2006.01)
  *F27D 1/00* (2006.01)
  *F27D 3/00* (2006.01)
  *F27D 5/00* (2006.01)

(52) U.S. Cl.
  CPC .......... *F27D 3/18* (2013.01); *F27D 2001/005* (2013.01); *F27D 2003/0006* (2013.01); *F27D 2003/185* (2013.01); *F27D 2005/0087* (2013.01); *F27M 2001/03* (2013.01)

(56) References Cited

U.S. PATENT DOCUMENTS

| | | | |
|---|---|---|---|
| 4,512,736 A | 4/1985 | Wader | |
| 9,809,495 B2 * | 11/2017 | Brunnmair | C04B 20/068 |
| 10,174,998 B2 * | 1/2019 | Brunnmair | F27D 3/0033 |
| 10,611,686 B2 | 4/2020 | Brunnmair et al. | |
| 2007/0275335 A1 * | 11/2007 | Biscan | B22F 3/003 431/160 |
| 2014/0291582 A1 | 10/2014 | Brunnmair | |
| 2018/0141862 A1 | 5/2018 | Brunnmair et al. | |

FOREIGN PATENT DOCUMENTS

| | | |
|---|---|---|
| FR | 1420639 | 11/1965 |
| FR | 2268227 | 11/1975 |
| WO | 92/06051 A1 | 4/1993 |
| WO | 2013/053635 A1 | 4/2013 |
| WO | 2016/191788 A1 | 12/2016 |

\* cited by examiner

DEVICE FOR PRODUCING EXPANDED MINERAL GRANULATED MATERIAL

TECHNICAL AREA

The invention relates to a device for producing a bloated mineral granulate with a heated processing channel for the mineral granulate fed to a conveying flow.

STATE OF THE ART

From the state of the art there are known devices for bloating mineral material, which devices have a heated processing channel for the mineral granulate (WO 2016/191788 A1). The supplied mineral granulate is fed into a conveying flow, heated to a critical temperature along a conveying path in the processing channel and consequently bloated, after which the bloated granulate is discharged from the processing channel by the conveying flow. The disadvantage is that the heated material has a softened and adhesive surface and can therefore adhere to the inner wall of the processing channel. As a result, the production process must be interrupted regularly in order to carry out maintenance and cleaning work on the inner wall of the processing channel, as otherwise the effective heating capacity of the device would be subject to permanent fluctuation due to the adhesive layer that forms and acts as an insulator. This effect is intensified by flow turbulences in the processing channel, such as those caused by fixtures, and can lead to a complete closure of the processing channel.

SUMMARY OF THE INVENTION

The invention is thus based on the task of designing a device of the type described above in such a way that a continuous, qualitatively controllable manufacturing process is achieved.

The invention solves the task set by providing an inflow opening in the processing channel for the formation of a granule-free laminar flow running along the inner wall of the processing channel.

These features enable a laminar flow to be applied to the inner wall of the processing channel when a process medium is introduced through the inflow opening. As the laminar flow acts as a kind of air curtain, mixing between the granule-free laminar flow and the conveying flow carrying the granulate is largely avoided. This significantly reduces the adhesion of expanded mineral granulate particles to the inner wall of the processing channel. The process medium, which is introduced into the processing channel to form the laminar flow, can have basically different gas compositions, whereby in the simplest case air is selected as process medium. The inflow opening can be formed in many different ways. For example, a supply line carrying the process medium can be designed to enter the processing channel in such a way that the inflow opening axis is parallel to the direction of the flow, whereby several inflow openings can also be provided. However, particularly favorable flow conditions are obtained if a circumferential inflow opening is provided. Although the inflow opening is basically a disturbing interruption of the processing channel, any flow turbulence can be reduced to a negligible level by the process medium input via the inflow opening in accordance with the invention. With regard to the flow directions of laminar and conveying flow, the device according to the invention can be operated both in countercurrent and in co-current flow mode. In the countercurrent process, the process medium is introduced into the processing channel against the direction of the conveying flow, which not only reduces the sticking of the conveyed mineral granulate, but also keeps mineral granulate particles away from the inflow opening, thus reducing the risk of the inflow opening being closed. Particle sizes above 100 μm are particularly suitable here, since in the countercurrent process the mineral granulate particles are essentially conveyed by gravity, whereby a supporting medium can also be introduced into the conveying flow. In the co-current process, which is particularly suitable for particle sizes below 100 μm, the conveying flow is supported in its conveying effect by the laminar flow running in the same direction, and the conveying flow is displaced radially inwards by the laminar flow, so that here too the adhesion of mineral granulate to the inner wall of the processing channel is reduced. Even though the cross-sectional geometry of the processing channel can be freely selected, favourable process conditions result from a circular channel cross-section.

In order to further reduce the adhesion of bloated mineral granules to the inner wall of the processing channel, it is suggested that the cross-section of the processing channel widens in the region of the inflow opening in the direction of laminar flow. This means that the inflow opening no longer has to protrude radially into the area of the conveying flow in the processing channel, but can, for example, enter the processing channel in an area radially outside the preceding channel section in the conveying direction. This further reduces the risk of flow turbulence caused by unevenness in the channel wall protruding into the conveying flow, which promotes the formation of the laminar flow and further reduces the adhesion of expanded mineral granulate particles. In addition, the arrangement of the inflow openings in an area radially outside of the conveying flow and the resulting better-acting air curtain prevents the closure of the inflow openings by mineral granulate adhering to them. This further improves the process conditions in counterflow processes in particular, because the laminar flow fills the processing channel volume resulting from the cross-sectional expansion.

In order to be able to carry out any necessary cleaning or maintenance work on the device according to the invention easily, it can be provided that the processing channel is arranged replaceably in a furnace shaft. As a result of these measures, the processing channel can be removed from the furnace shaft for cleaning purposes and then reinstalled or replaced in case of damage or after reaching its service life. In addition, this allows a modular design of the device, so that with only minor modifications to the device itself, it can be operated either in countercurrent or in co-current mode.

Particularly favourable design and process conditions are achieved when the processing channel comprises two channel sections with different cross-sections, whereby the channel section with a smaller cross-section projects into the channel section with a larger cross-section, forming the inflow opening. The channel sections can be aligned coaxially to each other with respect to their longitudinal axis and parallel to the direction of flow, whereby the channel section with a smaller cross-section can be enclosed by the channel section with a larger cross-section in such a way that an inflow opening is formed completely around the projecting area of the smaller channel section without any additional design measures. As a result, the laminar flow can be applied to the inner wall of the processing duct all around and essentially without interruption. In addition, an inlet channel running parallel to the direction of flow can be formed for the process medium flowing into the processing channel, depending on how far the channel section with a smaller cross-section extends into the channel section with a larger cross-section. This further promotes the formation of the laminar flow.

In order to further reduce the sticking of the mineral granulate by the laminar flow, the process medium of the laminar flow can have a different viscosity than the process medium of the conveying flow. The fact that the laminar flow and the conveying flow have different viscosity reduces boundary layer turbulences between the laminar flow and the conveying flow, thus extending the expansion of the forming air curtain in the longitudinal direction of the duct for the same inflow parameters. The viscosity can be adjusted via process parameters such as temperature or flow velocity of the process media of laminar or conveying flow.

The viscosity of the process medium of the laminar flow can also be adjusted in a favourable way if heating elements for the processing channel are arranged in a supply area for the laminar flow surrounding the processing channel. As a result of these measures, the laminar flow process fluid is passed through the supply area before being introduced into the processing channel through the inflow opening. Depending on the selected inflow velocity of the process medium into the supply area, the heat input into the process medium via the heating elements and consequently its viscosity can be adjusted. A particular advantage is that the heating elements only have to provide a temperature profile required for the isenthalpy bloating process of the mineral granulate and therefore the process medium for the laminar flow does not need a separate heating device or a separate temperature profile to adjust the viscosity of the process medium.

BRIEF DESCRIPTION OF THE INVENTION

In the drawing, for example, the object of the invention is shown, in which

Figure 2:
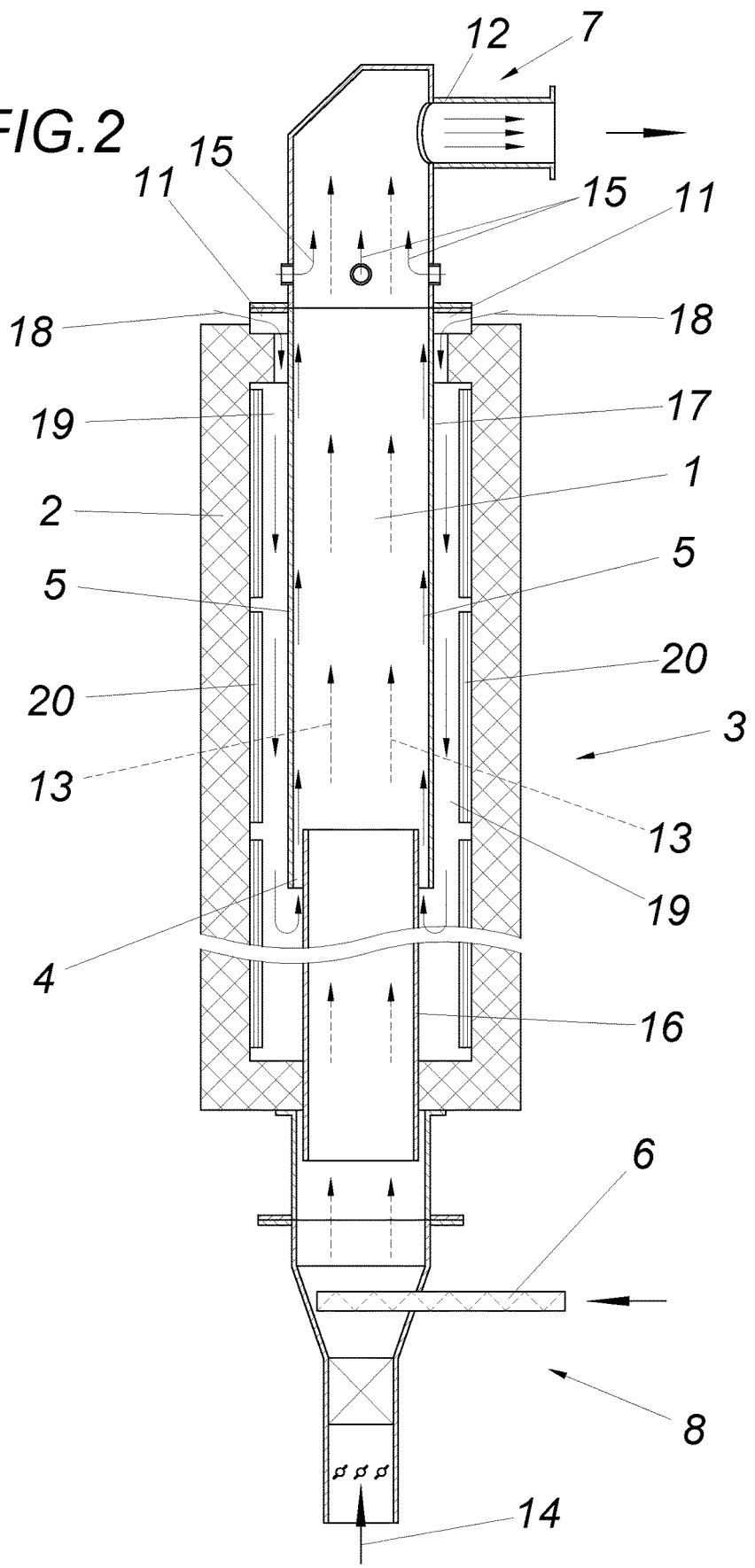

FIG. 1 is a schematic section of a device according to the invention with material feed from the head side and material discharge from the foot side in co-current operation, FIG. 2 a representation corresponding to FIG. 1 of a device according to the invention with material feed from the foot side and material discharge from the head side in counterflow operation.

WAYS TO EXECUTE THE INVENTION

A device according to the invention has a processing channel 1. The processing channel 1 is arranged in a furnace shaft 3, which is surrounded by a heat insulation jacket 2. In the processing channel, an inflow opening 4 according to the invention is provided for the formation of a granule-free laminar flow 5 running along the inner wall of the processing channel.

The mineral granulate, which may be based on bloatable volcanic glass, for example, is fed in via a feeding device 6, which in the design shown in FIG. 1 is assigned to a head section 7 connected to the processing channel 1. In contrast, the mineral granulate is discharged via a discharge section 9 assigned to a foot section 8, whereby the discharge can be supported by the supply of additional cooling air 10.

The laminar flow 5 is fed to the processing channel 1 via feed openings 11 provided in the furnace shaft 3, whereby the head section 7 also has a discharge area 12 for the laminar flow 5 running upwards along the inner wall of the processing channel. The laminar flow 5 forms a kind of air curtain which does not mix with the granule conveying flow 13 and thus prevents the softened granules from adhering to the inner wall of the processing channel. In addition, the laminar flow 5 can be preheated so that an additional chimney effect is created which further promotes the rising and application of the laminar flow 5 to the inner wall of the processing channel.

The design of a device according to the invention shown in FIG. 1 is particularly suitable for particle sizes above 100 μm, especially since in this case the granulate particles are conveyed through the processing channel 1 by gravity. The laminar flow 5 and the granule conveying flow 13 run in opposite flow directions in processing channel 1. The residence time of the particles in processing channel 1 can be adjusted, for example, by the inflow velocity of the laminar flow 5 or an additionally provided suction in the discharge area 12.

The design shown in FIG. 2 is particularly suitable for particle sizes below 100 μm. The laminar flow 5 and the granule conveying flow 13 have the same flow direction in processing channel 1. In this design, the granulate particles are fed into the processing channel 1 as a process medium via a feed device 6 assigned to the foot section 8 by means of injected process air 14. The dwell time of the particles in processing channel 1 can again be adjusted via the inflow velocity of the laminar flow 5, the inflow velocity of the process air 14 or via a discharge unit provided in a discharge area 12 assigned to the head section 7. In addition, additional cooling air 15 can be introduced into the head section 7.

Particularly favorable design conditions arise if the cross-section of the processing channel 1 widens in the area of the inflow opening 2 in the direction of inflow of the laminar flow 5, especially if the processing channel 1 comprises two channel sections 16 and 17 with different cross-sections, whereby the channel section 16 with a smaller cross-section protrudes into the channel section 17 with a larger cross-section, forming the inflow opening 4. In this case, the channel sections 16 and 17 may each have a circular cross-section and be aligned coaxially with respect to their longitudinal axis, the channel section 16 being partially pushed into the channel section 17. The cross-sectional geometry of the processing channel 1 or the channel sections 16 and 17 can be freely selected, whereby particularly favorable process conditions are achieved with a circular cross-section. According to a design, it can also be provided that processing channel 1 or channel sections 16 and 17 are formed by a suitable, heat-resistant foil.

It can also be provided that the laminar flow 5 discharged via the discharge area 12 is fed to a heat exchanger, for example for heat recovery, so that the process heat can in turn be transferred to a newly supplied process air 18 forming the laminar flow 5.

The processing channel 1 can be arranged replaceably in the furnace shaft 3, so that, for example, the channel sections 16 and 17 can be removed individually or together from the furnace shaft 3 in order to be able to carry out any necessary maintenance work more easily or to replace the processing channel 1 or the channel sections 16 and 17. Likewise, the head section 7 and the foot section 8 can each be attached interchangeably to the processing channel 1 and/or the furnace shaft 3, thus enabling a modular design of the device that can be adapted to the intended application. Thus, it is possible to change, for example, between a countercurrent process according to FIG. 1 and a co-current process according to FIG. 2 or between a process with particle sizes above 100 μm and below 100 μm by only minor modifications or by simply exchanging the head section 7 with the foot section 8.

The device may have a supply area 19 for the laminar flow 5 surrounding the processing channel 1. In the supply area 19, heating elements 20 for the processing channel 1 can be arranged, which then simultaneously serve to heat the laminar flow 5. The heat input into the laminar flow can, for example, be adjusted via the inflow velocity of the process air 18 forming the laminar flow 5 into the supply area 19.

The invention claimed is:

1. An apparatus for producing a mineral granulate, said apparatus comprising:
    a heated processing channel for mineral granulate fed to a conveying flow;
    said processing channel having an inflow opening therein forming a granulate-free laminar flow running along an inner wall of the processing channel;
    wherein the processing channel comprises two channel sections with cross-sections, one of said cross-sections being larger than the other of said cross-sections;
    wherein the channel section with the smaller cross-section projects into the channel section with the larger cross-section so as to form the inflow opening between an inside wall of the channel section with the larger cross-section and a portion of the channel section with the smaller cross-section that is located inside said inside wall; and
    wherein the channel section with the smaller cross-section is enclosed by the channel section with the larger cross-section so that the inflow opening extends completely around the portion of the channel section with the smaller cross-section that is inside said inside wall of the channel section with the larger cross-section and provides the granulate-free laminar flow along the inner wall of the processing channel.

2. An apparatus according to claim 1, wherein the processing channel has a cross-section that widens in a region of the inflow opening in an inflow direction of the laminar flow.

3. An apparatus according to claim 2, wherein the processing channel is replaceably arranged in a furnace shaft.

4. An apparatus according to claim 3, wherein the laminar flow has a process medium with a viscosity that differs from viscosity of a process medium of the conveying flow.

5. An apparatus according to claim 4, wherein heating elements operatively associated with the processing channel are arranged in a supply area of the laminar flow surrounding the processing channel.

6. An apparatus according to claim 3, wherein heating elements operatively associated with the processing channel are arranged in a supply area of the laminar flow surrounding the processing channel.

7. An apparatus according to claim 2, wherein the laminar flow has a process medium with a viscosity that differs from viscosity of a process medium of the conveying flow.

8. An apparatus according to claim 7, wherein heating elements operatively associated with the processing channel are arranged in a supply area of the laminar flow surrounding the processing channel.

9. An apparatus according to claim 2, wherein heating elements operatively associated with the processing channel are arranged in a supply area of the laminar flow surrounding the processing channel.

10. An apparatus according to claim 1, wherein the processing channel is replaceably arranged in a furnace shaft.

11. An apparatus according to claim 10, wherein the laminar flow has a process medium with a viscosity that differs from viscosity of a process medium of the conveying flow.

12. An apparatus according to claim 11, wherein heating elements operatively associated with the processing channel are arranged in a supply area of the laminar flow surrounding the processing channel.

13. An apparatus according to claim 10, wherein heating elements operatively associated with the processing channel are arranged in a supply area of the laminar flow surrounding the processing channel.

14. An apparatus according to claim 1, wherein the laminar flow has a process medium with a viscosity that differs from viscosity of a process medium of the conveying flow.

15. An apparatus according to claim 14, wherein heating elements operatively associated with the processing channel are arranged in a supply area of the laminar flow surrounding the processing channel.

16. An apparatus according to claim 1, wherein heating elements operatively associated with the processing channel are arranged in a supply area of the laminar flow surrounding the processing channel.

* * * * *